United States Patent [19]
Branan, Jr. et al.

[11] Patent Number: 5,111,128

[45] Date of Patent: May 5, 1992

[54] BATTERY IDENTIFICATION APPARATUS

[75] Inventors: Mac William Branan, Jr., Fort Lauderdale; Michael Robinson, Sunrise, both of Fla.

[73] Assignee: Motorola, Inc., Schaumburg, Ill.

[21] Appl. No.: 628,959

[22] Filed: Dec. 17, 1990

[51] Int. Cl.$^5$ .............................................. H02J 7/00
[52] U.S. Cl. ........................................ 320/2; 320/3; 429/7
[58] Field of Search ........................ 320/2, 3, 4, 6, 15, 320/20, 21, 22, 23, 24, 43, 44; 429/7, 9, 93, 98, 99

[56] References Cited

U.S. PATENT DOCUMENTS

| | | | |
|---|---|---|---|
| 4,006,396 | 2/1977 | Bogut | 320/2 |
| 4,680,527 | 7/1987 | Benenati et al. | 320/2 |
| 4,746,852 | 5/1988 | Martin | 320/20 |
| 4,940,966 | 7/1990 | Pettigrew et al. | 340/551 |
| 5,017,868 | 5/1991 | Hajzler | 324/207.22 |

FOREIGN PATENT DOCUMENTS 0069224  3/1989  Japan ..................................... 320/3
2115242  9/1983  United Kingdom .................. 320/22

OTHER PUBLICATIONS

Eric Brooks; Electrical Battery Interlock to Insure Intrinsic Safety, Aug., 1989; Motorola Technical Developments.

Primary Examiner—Steven L. Stephan
Assistant Examiner—Kristine Peckman
Attorney, Agent, or Firm—Pablo Meles

[57] ABSTRACT

A battery comprises a housing having at least one rechargeable cell within the housing, wherein the cells have a predetermined characteristic. Magnetized elements within the housing provide information to a charger, wherein the arrangement and number of the magnetized elements is indicative of the predetermined characteristic of the cell or cells.

18 Claims, 3 Drawing Sheets

BATTERY IDENTIFICATION APPARATUS

TECHNICAL FIELD

This invention relates generally to batteries and chargers, and more specifically to a scheme using magnetized material for detecting the characteristics of a battery to provide an optimum charging strategy.

BACKGROUND

The types of rechargeable battery packs for portable electronic products are increasing in terms of different charge capacity and different cell technology or chemistry. Since each particular battery has their optimum charging profile, a method of distinguishing each battery's charging capacity becomes increasingly difficult. Likewise, each battery chemistry has it's own optimum charging "signature" or profile that allows for a safe rapid charge and cut-off to trickle charge or no charge. The need for today's smart or "Universal" charger to inexpensively distinguish the different cell capacities and cell chemistries increases as the variety of batteries in the market continues to grow. An inappropriately charged battery not only diminishes battery life and efficiency, but could also create a severe hazard due to overcharging and overheating.

A battery charger generally cannot determine the charge capacity and battery cell chemistry inexpensively. U.S. Pat. No. 4,006,396 by Bogut discusses an inexpensive universal battery charging scheme which provides an electrical element having a characteristic related to a predetermined charging rate of the battery. The use of the electrical element in '396 requires an additional contact in both the battery housing and charger, thereby reducing the mechanical integrity of the battery and charger housing. Thus, a need for other inexpensive methods of determining charge capacity and other battery characteristics exists that enhances the mechanical integrity of the battery housing and charger housing.

SUMMARY OF THE INVENTION

Accordingly, a battery identification system, comprises a battery housing having at least one cell within the housing. The housing further comprises a number of magnetized elements for indicating a battery characteristic to a magnetic sensing means within a charger so as to provide an optimal charging rate and/or pattern to the battery.

DETAILED DESCRIPTION OF THE PREFERRED EMBODIMENT

Figure 1A:
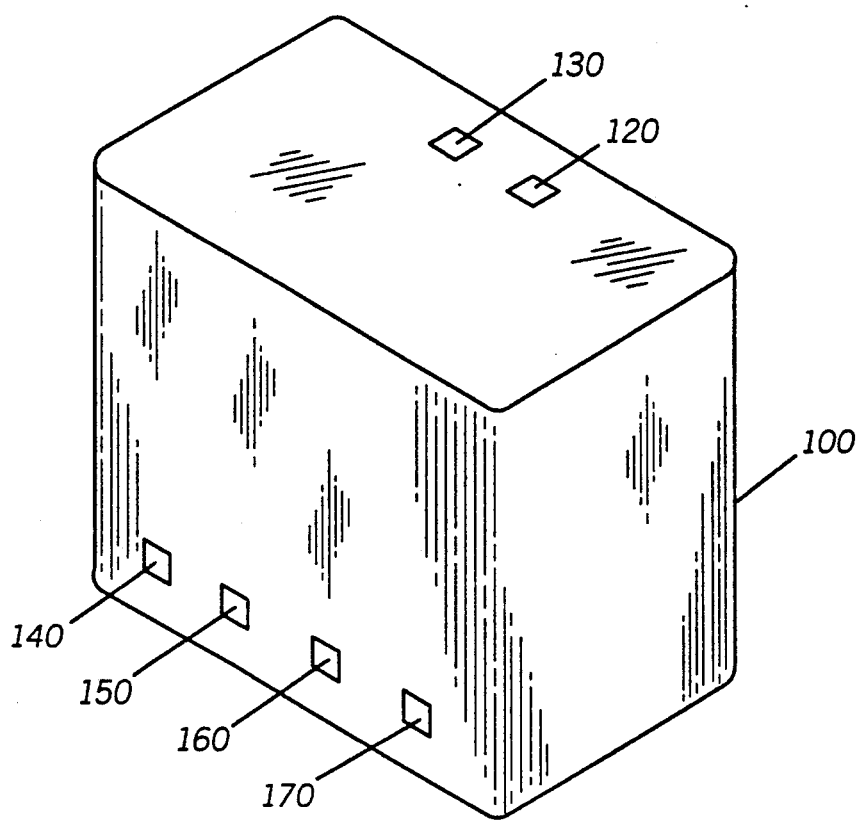
FIG. 1A is a perspective view of a conventional battery.
Figure 1B:
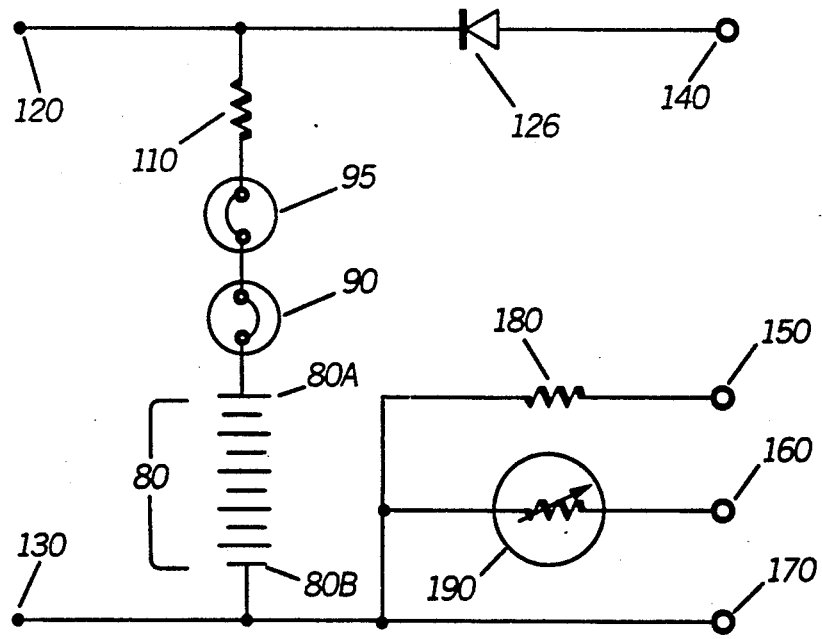
FIG. 1B is a schematic diagram of the circuit for the battery of FIG. 1A.

Referring to FIG. 1A, there is shown a battery 100 well known in the art, and discussed in U.S. Pat. No. 4,680,527. The battery preferably comprises a positive contact 120 and a negative contact 130 which couple to contacts on a portable electronic device such as a two-way radio (not shown). Battery 100 further includes battery charger contacts 140, 150, 160, and 170. FIG. 1B is the schematic diagram of the battery circuit contained within battery 100. Battery 100 comprises a group of cell 80 coupled together in series. A positive terminal at one end of the cell group is designated 80A and the corresponding negative terminal is designated 80B. Positive terminal 80A and negative terminal 80B are coupled to battery contacts 120 and 130 respectively.

To prevent battery 100 from overheating due to shorting of contacts 120 and 130, a thermostat 90 is coupled in series with positive terminal 80A and battery contact 120 as seen in FIG. 1B. To further protect battery 100 from high temperature, a thermofuse 95 is coupled in series with a nichrome resistor 110 between contact 120 and thermostat 90.

Battery contacts 140, 150, 160, and 170 are employed for charging battery 100. Battery contact 140 is coupled via a diode 126 to battery terminal 80A. The polarity of diode 126 is selected to prevent cell group 80 from discharging into a battery charger (not shown) which is coupled to battery contacts 170 and 140.

A coding resistor 180 is coupled between contact 150 and terminal 80B which is designated as ground. The value of resistor 180 is arbitrarily selected to indicate the capacity of cell group 80 to the battery charger so that the charger can send the appropriate magnitude of charging current to cell group 80. For example, assigning a value to resistor 180 of 500 ohms would indicate to the charger that cell group 80 exhibits a capacity of 500 maH. Assigning a value to resistor 180 of 1000 ohms would indicate to the charger that cell group 80 exhibits a capacity of 1000 maH. The charger, which is coupled to contact 150 senses the value if resistor 180, determines the capacity of cell group 80 and then sends the appropriate charging current to cell group 80 corresponding to the determined capacity of such cell group. To facilitate when the battery 100 must discontinue charging, a thermistor 190 coupled between battery contact 160 and reference 80B is provided. As the battery 100 is charged, the temperature rises until it reaches a temperature plateau indicating a complete charge. Surpassing this battery temperature plateau would indicate overcharging resulting in potential damage to the battery. Thus, to prevent overcharging the battery contact 160 couples to the charger which senses the resistance of thermistor 190 and indicates when a full charge is achieved.

Figure 2:
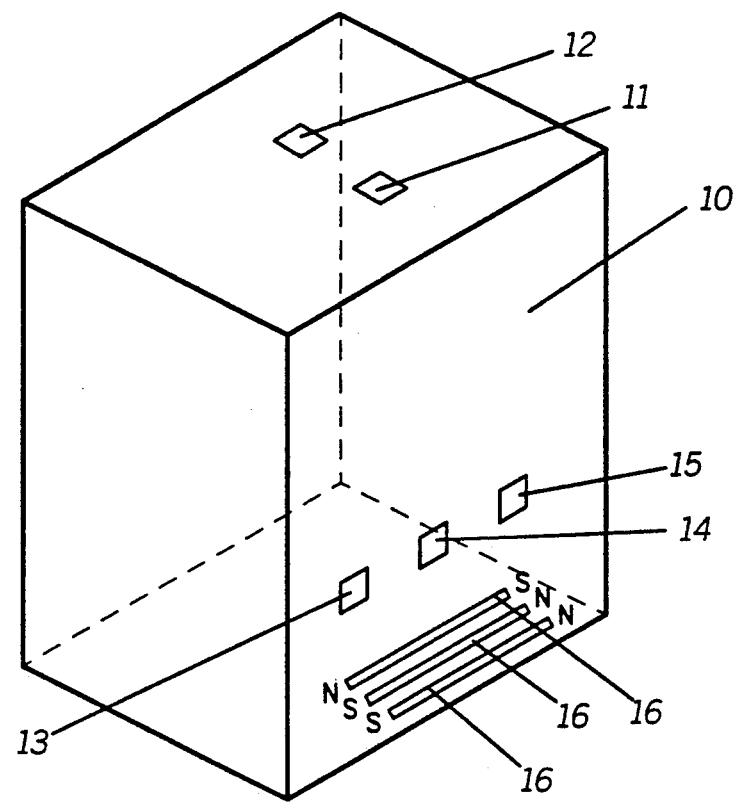
FIG. 2 illustrates a battery housing having magnetic elements in the housing in accordance with the present invention.
Figure 3:
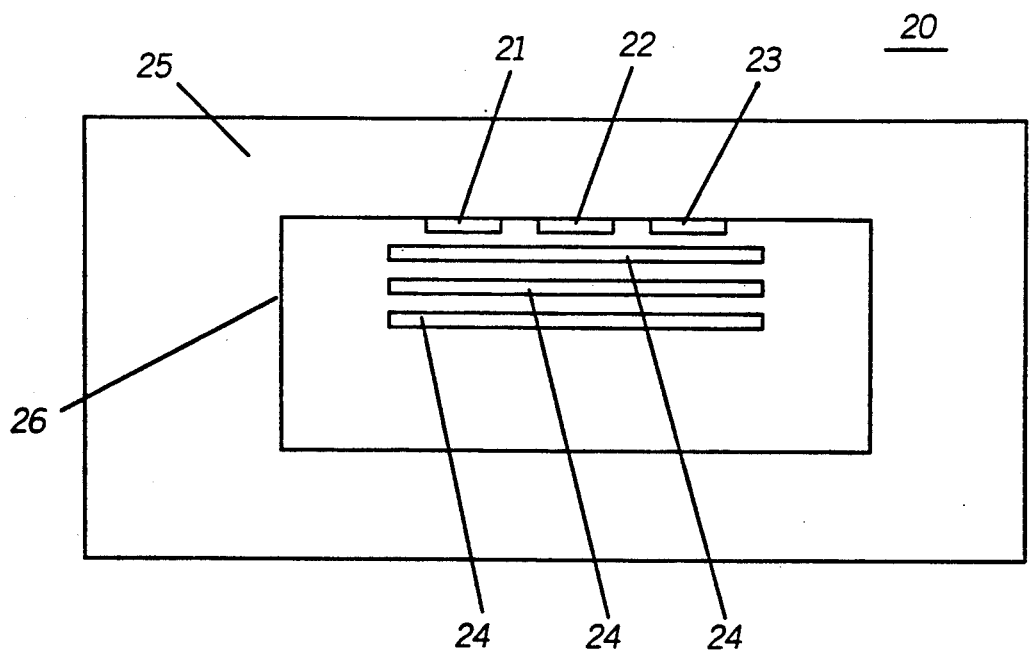
FIG. 3 is a top view of a charger in accordance with the present invention.

Referring to FIG. 2, there is shown a battery 10 having features similar to battery 100. Battery 10 includes positive and negative contacts 11 and 12 respectively and positive and negative charger contacts 13 and 14 respectively. Charger contact 15 is preferably coupled to ground via a thermistor (not shown) serving the same purpose as thermistor 190 in FIG. 1B. Note that this embodiment does not have a fourth contact which would be coupled to a code resistor. In this embodiment, a series of magnetic elements 16 having a unique arrangement (in terms of polarity and spacing) is illustrated. The arrangement of the magnetic elements serves an analogous function served by the resistor 180 of battery 100 of FIG. 1. For example, instead of using arbitrary resistor values to indicate a particular charging capacity, the unique arrangement of polarity (in this case N-S, S-N, S-N) could indicate a charging capacity, while the location of the magnetic elements could indicate the particular cell chemistry (or vice-versa) if desired. Different cell chemistries such as Nickel Metal Hydride, NiCad, Zinc-Air and cell arrangements within a battery pack (such as a parallel connection or a series connection) have different ideal charging algorithms with different peak voltages and other characteristics that can be simply differentiated by use of the present invention. FIG. 3, illustrates the top view of a charger 20 that could be used with the present invention. The charger 20 comprises a housing 25 having a pocket 26 wherein lies charger contacts 21, 22, and 23. These contacts are arranged and constructed to protrude from the lower wall portion of the pocket 26 so as to couple with the associated charger contacts 13, 14, and 15 respectively of the battery 10 when the battery is inserted into the charger 20. Charger 20 further includes magnetic sensing means 24, which do not necessarily need to be exposed on the bottom surface of the pocket. The magnetic sensing means 24 preferably comprises hall effect switches which could easily be inbedded within the housing 25 or reside below the housing surface on a printed circuit board. Regardless, the magnetic sensing means would sense the arrangement of the magnetic elements 16 when the battery 10 is inserted. Thus, a simple network of logic gates or a microprocessor (not shown) having pre-defined settings in memory corresponding to the different cell chemistries or capacities could easily determine the battery capacity and or chemistry and provide the appropriate charging scheme to the battery 10.

Figure 4:
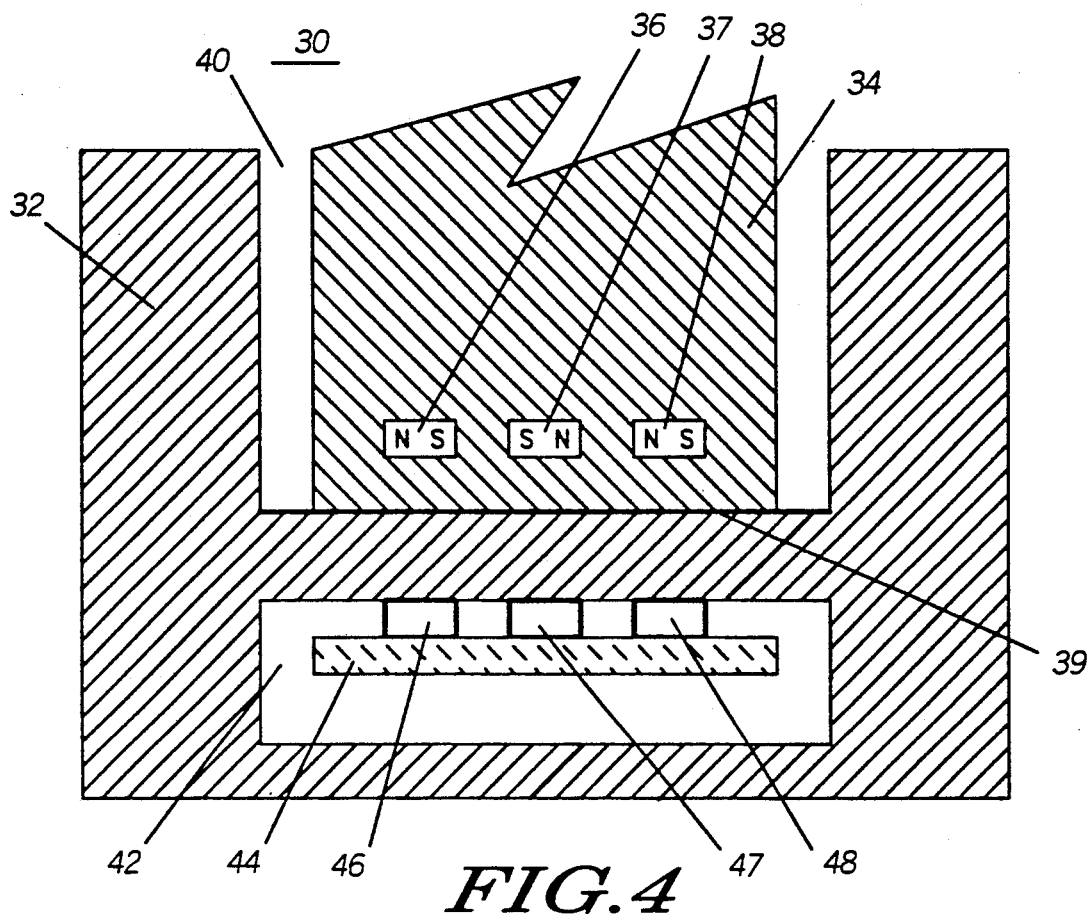
FIG. 4 is a side view of a battery and charger in accordance with the present invention.

FIG. 4 illustrates a cut view of a battery identification apparatus 30 in accordance with present invention. The lower portion of a battery housing 34 contains magnetic elements 36, 37, and 38 having a previously defined polarity sequence (for example: N-S, S-N, and N-S as shown). The charger includes a housing 32 and pocket 40 wherein the battery housing 34 is inserted. In this embodiment, the charger comprises a series of magnetic sensing means 46, 47, and 48 which lie below the bottom surface 39 of the charger within a cavity 42. The magnetic sensing means is preferably mounted on a printed circuit board 44 having the appropriate logic circuitry well known in the art for distinguishing between combinations. In this instance, 3 sensors would allow for 27 possible conditions with three states per sensor (N-S, S-N, or no magnetic element). 2 sensors would provide for 9 possible states and 1 sensor would allow for 3 possible states. Although, at present, batteries would not likely come in more than 3 or 4 possible capacities, the extra states can denote invalid conditions and force the charger to a low current trickle charge or no charge at all. Furthermore, the charger could prevent inappropriate batteries from charging if they do not contain magnetic elements.

Figure 5:
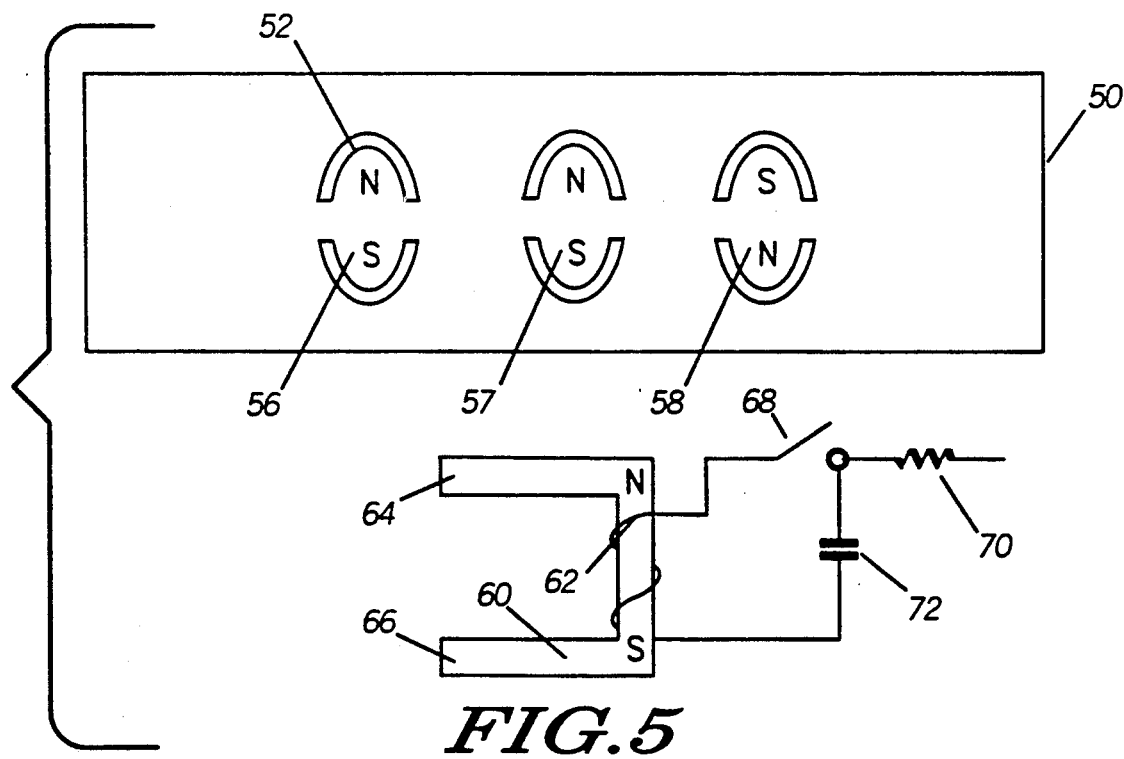
FIG. 5 illustrates a top view of magnetized elements for use in the present invention.

FIG. 5 illustrates a magnetic element that could be used within the battery in accordance with the present invention. A metallic material 50, preferably made of magnetizable material such as iron, has opposing substantially "U" shaped holes 52 stamped out of material 50 as shown. The holes 52 creates metallic strips 56, 57, and 58 which can be magnetized in a defined polarity sequence by a simple magnetizing device 60 well known in the art. The "U" shaped magnetizing device 60 has two poles 64 and 66 and a simple circuit including a winding 62, a switch 68, a capacitor 72, and resistor 70 for magnetizing the magnetic elements 56, 57, and 58. Operationally, a large current is momentarily provided through winding 62, which induces magnetic field lines about poles 64 and 66. The magnetizing device 60 is placed adjacent (above or below) each of the metal strips. The metal strips (56, 57, and 58) are given their polarization dependent on the direction of the current provided through the magnetizing device 60. Once the metallic material 50 is magnetized with the desired polarization, the metallic material can be placed on the bottom of the battery housing. Alternatively, the metallic material 50 could be placed on the bottom of the battery housing and then subsequently magnetically polarized.

What is claimed is:

1. A battery, comprising:
   a housing;
   at least one rechargeable cell within said housing, having a predetermined characteristic;
   magnetized elements in a predetermined arrangement and number within said housing for providing information to a charger, whereby the arrangement and number of said magnetized elements is indicative of said predetermined characteristic.

2. The battery of claim 1, wherein said predetermined characteristic is the charge capacity of the at least one rechargeable cell within said housing.

3. The battery of claim 1, wherein said predetermined characteristic is the cell chemistry of the at least one rechargeable cell within said housing.

4. The battery of claim 1, wherein said predetermined characteristic is the cell chemistry and charge capacity of the at least one rechargeable cell within said housing.

5. The battery of claim 1, wherein said charger includes a magnetic sensing means for distinguishing the arrangement and number of said magnetized elements within said housing.

6. The battery of claim 5, wherein said magnetic sensing means comprises a hall effect sensing device.

7. A battery identification system, comprising:
   a battery housing having at least one cell within said housing;
   a plurality of magnetized elements within said housing for indicating a battery characteristic;
   charging means for charging said cell;
   magnetic sensing means within said charging means for sensing said magnetic material and determining said battery characteristic.

8. The battery of claim 7, wherein said battery characteristic is the charge capacity of the at least one rechargeable cell within said housing.

9. The battery of claim 7, wherein said battery characteristic is the cell chemistry of the at least one rechargeable cell within said housing.

10. The battery of claim 7, wherein said battery characteristic is the cell chemistry and charge capacity of the at least one rechargeable cell within said housing.

11. The battery of claim 7, wherein said magnetic sensing means comprises a hall effect sensing device.

12. A battery identification system, comprising:
   a battery housing having at least one cell within said housing, said cell having a predetermined battery characteristic;

magnetic elements within said battery housing having a north and south polarity, said magnetic elements having an orientation indicative of said predetermined battery characteristic.

13. The battery identification system of claim 12, wherein said system further includes charging means for charging said cell.

14. The battery identification system of claim 13, wherein said charging means further comprises a magnetic sensing means for sensing said magnetic elements and determining said battery characteristic.

15. The battery identification system of claim 12, wherein said system further comprises a magnetic sensing means for sensing said magnetic elements and determining said battery characteristic.

16. The battery identification system of claim 12, wherein said magnetic elements comprises a plurality of magnets, each magnet having a north and south orientation, whereas each orientation is indicative of the predetermined battery characteristic.

17. The battery identification system of claim 12, wherein said magnetic means comprises a plurality of magnets, each magnet having a north and south orientation, whereas each orientation and location of said magnet is indicative of the battery characteristic.

18. A charger, comprising:
a housing;
means within said housing for sensing magnetized elements in a battery and for recognizing a predetermined battery characteristic.

* * * * *